Patented Dec. 22, 1953

2,663,714

UNITED STATES PATENT OFFICE 2,663,714

HYDROGENATED BENZ [CD] INDOLES

Edmund C. Kornfeld, Indianapolis, Ind., assignor to Eli Lilly and Company, Indianapolis, Ind., a corporation of Indiana No Drawing. Application September 24, 1951, Serial No. 248,103

7 Claims. (Cl. 260—319)

This invention relates to novel organic compounds and more particularly to hydrogenated benz[cd]indoles and their preparation.

The hydrogenated benz[cd]indoles produced by means of the intermediate compounds and methods of this invention are represented by the following formula

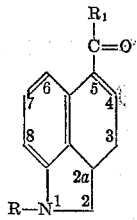

in which R represents H or a carboxyacyl radical such as a radical of a lower aliphatic carboxylic acid or a monocyclic aromatic hydrocarbon carboxylic acid, and $R_1$ represents hydrogen or a lower alkyl radical.

The above represented indole compounds are prepared by a series of reactions comprising the hydrogenation of indole-3-propionic acid and cyclization of an acid halide of the acylated hydrogenated compound with aluminum chloride to produce an N-acyl-5-keto-1,2,2a,3,4,5-hexahydrobenz[cd]indole.

From the benz[cd]indole the 5-formyl compound, which is represented by the foregoing formula when $R_1$ is hydrogen, is obtained as follows:

The benz[cd]indole is reacted with a chloroacetic acid ester in a Darzen's type reaction to produce a glycidic compound which is hydrolysed to the sodium salt of the glycidic acid. Reaction of the sodium salt with pyridine hydrobromide perbromide and treatment of the intermediate bromoaldehyde with semicarbazide yields a semicarbazone of an N-acyl-5-formyl-1,2,2a,3-tetrahydrobenz[cd]indole. Removal of the semicarbazide group yields an N-acyl-5-formyl-1,2,2a,3-tetrahydrobenz[cd]indole, from which the N-acyl group can be removed by hydrolysis. Alternatively, the bromoaldehyde can be obtained by converting the sodium salt of the glycidic acid into an enolacetate and reacting the enolacetate with pyridine hydrobromide perbromide.

From the N-acyl-5-keto-1,2,2a,3,4,5-hexahydrobenz[cd]indole the 5-acyl compounds which are represented by the above formula when $R_1$ is a lower alkyl group, are prepared as follows:

The N-acyl-5-keto-1,2,2a,3,4,5-hexahydrobenz[cd]indole is reacted with an α-haloalkyl cyanide in a Darzen's reaction to produce a glycidonitrile compound which upon reaction with hydrogen chloride followed by treatment with collidine yields an N,5-diacyl compound from which the N-acyl group can be removed by hydrolysis.

The reactions set forth above are shown by means of the following series of equations which, for the sake of simplicity are limited to the illustration of the reactions leading to the production of 5-formyl-1,2,2a,3-tetrahydrobenz[cd]indole and 5-acetyl-1,2,2a,3-tetrahydrozenz[cd]indole.

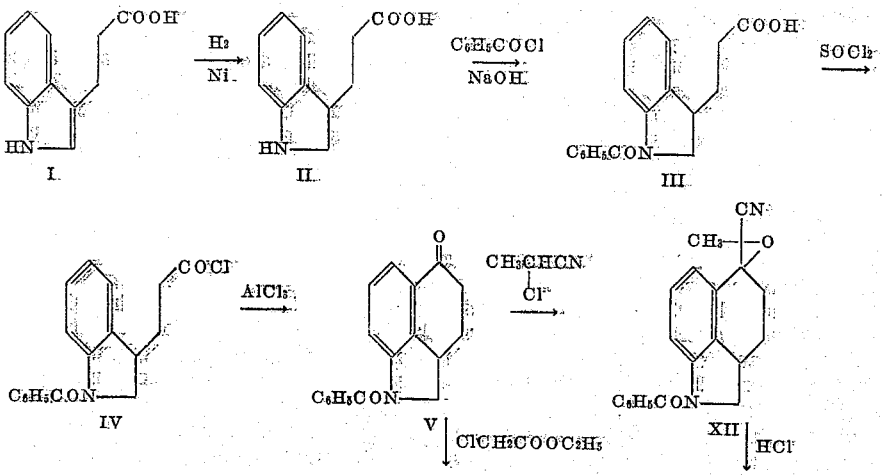

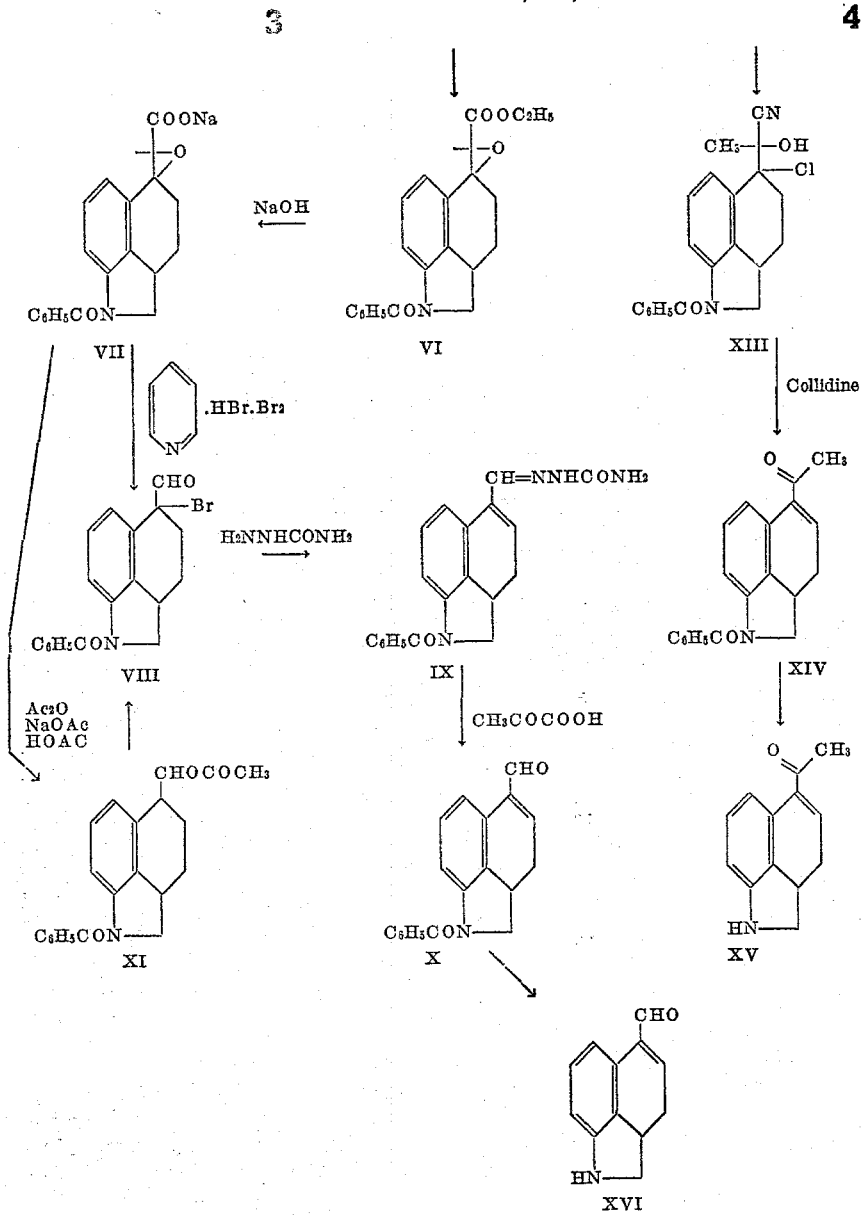

The above series of reactions is illustrative only, and obvious modifications will be apparent to those skilled in the art. Thus for example, although certain of the reactions as illustrated employ a particular acyl halide or a particular carboxylic acid ester, other equivalent halides and esters can be employed.

The compounds of this invention are useful intermediates in the synthesis of organic compounds having hydrogenated benz[cd]indole nuclei. They are especially suitable for employment in syntheses of compounds having the ring systems of the ergot alkaloids, for example, lysergic acid. A few illustrative examples of the useful synthetic procedures in which the novel compounds of this invention can be employed are as follows:

N - benzoyl - 5 - formyl - 1,2,2a,3 - tetrahydrobenz[cd]indole can be reacted with an ω-cyano or ω-acetalyl-N-methyl-propylamine to yield, respectively, a nitrile or aldehyde containing the lysergic acid ring system. Hydrolysis and oxidation of the nitrile or aldehyde yield lysergic acid. Alternatively, the 5-formyl compound can be reacted with acetylene, the acetylenic carbinol reacted with nickel carbonyl and the acrylic acid compound so produced reacted with methylamine and dehydrated to yield an N-benzoyl-dihydrolysergic acid which can be hydrolysed and oxidized to form lysergic acid. The 5-formyl compound can also be reacted with malonic acid, formaldehyde, and methylamine to yield an N-benzoyl-dihydrolysergic acid which when treated as described above yields lysergic acid.

Reaction of N-benzoyl-5-acetyl-1,2,2a,3-tetrahydrobenz[cd]indole with formaldehyde and methylamine yields a cyclized product having a lysergic acid-like ring structure. Introduction of the carboxyl group in a position corresponding to that in lysergic acid is accomplished by formylation followed by treatment with hydroxylamine and base. Reduction and subsequent dehydration, hydrolysis and oxidation yields lysergic acid. Alternatively, the formylation and treatment with hydroxylamine can precede the Mannich reaction, i. e. the reaction with formaldehyde and methylamine. A further synthesis of lysergic acid comprises reacting the 5-acetyl compound with ethyloxalate and treating the oxalyl ketone with formaldehyde and methylamine by the procedure of the Mannich reaction.

The resulting compound is reduced, dehydrated, decarbonylated, hydrolysed and oxidized to yield lysergic acid.

The following examples further illustrate the methods and products of this invention.

EXAMPLE 1

*N-benzoyl-5-keto-1,2,2a,3,4,5-hexahydrobenz-[cd]indole*

A mixture of 118 g. (0.4 mol) of N-benzoyl-indoline-3-propionic acid, prepared according to the method of Robinson [J. Chem. Soc. 1931, 3158] and 200 ml. of thionyl chloride was allowed to stand at room temperature for ½ hour and was warmed on a steam bath for about 20 minutes. The excess thionyl chloride was evaporated in vacuo, and the residue comprising N-benzoylindoline-3-propionyl chloride, was dissolved in 200 ml. of dry carbon disulfide. The solution was added in a thin stream to a vigorously stirred suspension of 240 g. of aluminum chloride in 1750 ml. of carbon disulfide. The mixture was refluxed and stirred for one hour and treated with a mixture of 500 g. of ice, 250 ml. of concentrated hydrochloric acid, and 500 ml. of water. The mixture was stirred during the addition of the ice mixture and was cooled by intermittently distilling a portion of the carbon disulfide in vacuo. After addition of all of the ice mixture, the carbon disulfide remaining was distilled in vacuo and the aqueous residue was extracted with 2 l. of benzene. The benzene extract was dried over magnesium sulfate and evaporated in vacuo to a small volume. Several volumes of petroleum ether were added slowly to the concentrate whereupon a yellow crystalline precipitate of N-benzoyl-5-keto-1,2,2a,3,4,-5-hexahydrobenz[cd]indole separated. The precipitate was filtered off, washed with petroleum ether, and recrystallized from benzene-petroleum ether mixture. After recrystallization from benzene-petroleum ether mixture, it melted at about 146–147° C.

Analysis:
Calculated for $C_{18}H_{15}NO_2$: C, 77.96; H, 5.45; N, 5.05.
Found: C, 78.15; H, 5.31; N, 5.15.

EXAMPLE 2

*5-keto-1,2,2a,3,4,5-hexahydrobenz[cd]indole*

A mixture of 30 g. of N-benzoyl-5-keto-1,2,2a,3,4,5-hexahydrobenz[cd]indole, 300 ml. of concentrated hydrochloric acid, and 225 ml. of glacial acetic acid was refluxed for 16 hours. The solution was evaporated to dryness in vacuo. The residue was dissolved in water, treated with activated carbon, and filtered. An excess of ammonium hydroxide was added to the filtrate, whereupon a precipitate of 5-keto-1,2,2a,3,4,5-hexahydrobenz[cd]indole separated. The precipitate was filtered off and recrystallized from methanol.

After recrystallization 5-keto-1,2,2a,3,4,5-hexahydrobenz[cd]indole melted at about 126–127° C.

Analysis:
Calculated for $C_{11}H_{11}NO$: C, 76.27; H, 6.40; N, 8.09.
Found: C, 75.97; H, 6.60; N, 8.43.

5 g. of 5-keto-1,2,2a,3,4,5-hexahydrobenz[cd]indole were dissolved in 20 ml. of a mixture of equal parts of ethanol and ether, and dry hydrogen chloride was passed into the solution until precipitation was complete. The precipitate of 5-keto-1,2,2a,3,4,5-hexahydrobenz[cd]indole hydrochloride was filtered off and dried. It melted with decomposition at about 195–200° C.

Analysis:
Calculated for $C_{11}H_{11}NO·HCl$: C, 63.01; H, 5.77.
Found: C, 63.21; H, 6.01.

5-keto-1,2,2a,3,4,5-hexahydrobenz[cd]indole hydrobromide which was prepared in a manner analogous to the preparation of the hydrochloride salt, melted with decomposition at about 212–215° C.

Analysis:
Calculated for $C_{11}H_{11}NO·HBr$: N, 5.51; Br, 31.45.
Found: N, 5.43; Br, 31.74.

EXAMPLE 3

*N-acetyl-5-keto-1,2,2a,3,4,5-hexahydrobenz-[cd]indole*

A solution of 1 g. of 5-keto-1,2,2a,3,4,5-hexahydrobenz[cd]indole in a mixture of 12.5 ml. of pyridine and 12.5 ml. of acetic anhydride was allowed to stand at room temperature for ½ hour and was then warmed on a steam bath for about 15 minutes. The excess acetic anhydride was decomposed by the addition of methanol, and the solution was evaporated to small volume in vacuo. The addition of a few milliliters of water to the liquid residue caused the precipitation of N-acetyl-5-keto-1,2,2a,3,4,5-hexahydrobenz[cd]indole. The precipitate was filtered off, was washed successively with portions of dilute hydrochloric acid and water, and was recrystallized from ethanol. After recrystallization it melted at about 177.5–178.5° C.

Analysis:
Calculated for $C_{13}H_{13}NO_2$: C, 72.54; H, 6.09; N, 6.51.
Found: C, 72.22; H, 6.23; N, 6.70.

EXAMPLE 4

*N-butyryl-5-keto-1,2,2a,3,4,5-tetrahydrobenz[cd]indole*

A solution of 1 g. of 5-keto-1,2,2a,3,4,5-hexahydrobenz[cd]indole in a mixture of 5 ml. of pyridine and 5 ml. of butyric anhydride was allowed to stand at room temperature for ½ hour and was then heated on a steam bath for about 15 minutes. The excess butyric anhydride was decomposed with methanol, and the solution was evaporated to small volume in vacuo. Upon addition of a few milliliters of water to the residue, N-butyryl-5-keto-1,2,2a,3,4,5-hexahydrobenz[cd]indole precipitated. The precipitate was filtered off, washed successively with dilute hydrochloric acid and water, recrystallized from ethanol, and dried. After recrystallization it melted at about 137.5–138.5° C.

Analysis:
Calculated for $C_{15}H_{17}NO_2$: C, 74.04; H, 7.04; N, 5.76.
Found: C, 74.43; H, 7.18; N, 5.70.

By similar methods as set forth above and by using the appropriate acyl halide there are obtained the N-benzoyl, -tolyl, -valeryl, -heptanoyl, and like acyl derivatives of 5-keto-1,2,2a,3,4,5-hexahydrobenz[cd]indole.

EXAMPLE 5

*N-acetyl-5-keto-1,2,2a,3,4,5 - hexahydrobenz[cd] indole*

N-acetylindoline-3-propionic acid was prepared by the reduction and acetylation of indole-3-propionic acid.

A mixture of 23.3 g. (0.1 mol) of N-acetylindoline-3-propionic acid and 50 ml. of pure thionyl chloride was allowed to stand for ½ hour at room temperature and thereafter was warmed for about 20 minutes on a steam bath. The excess of thionyl chloride was removed by evaporation in vacuo. The residue was dissolved in 50 ml. of dry nitrobenzene, and the nitrobenzene solution was added in a thin stream to a vigorously stirred suspension of 60 g. of anhydrous aluminum chloride in 150 ml. of nitrobenzene, the reaction mixture being cooled externally to maintain the reaction temperature at about 10° to 20° C. The mixture was then stirred and heated at 50° C. for about 3 hours and allowed to stand at room temperature for a few hours. The reaction mixture was cooled to 20° C. and decomposed by the slow addition of a mixture of 100 g. of crushed ice, 100 ml. of concentrated hydrochloric acid, and 200 ml. of water. The lower nitrobenzene layer was separated and washed with three 150 ml. portions of 2N sodium hydroxide solution, and then with water. The washed nitrobenzene layer was separated and steam distilled to remove the nitrobenzene. The aqueous residue which contained a precipitate of N-acetyl - 5-keto-1,2,2a,3,4,5-hexahydrobenz[cd] indole was filtered, and the precipitate was washed with water and dried. The dry material melted at about 174.5–176.5° C.

EXAMPLE 6

*Sodium β-5-(N-benzoyl-1,2,2a,3,4,5 - hexahydrobenz[cd]indolyl) glycidate*

32.4 g. (0.83 gram atom) of potassium were dissolved in a mixture of 800 ml. of dry tertiary butanol and 700 ml. of dry benzene maintained under nitrogen. The solvents were removed in vacuo, and the potassium t.-butoxide was suspended in 1500 ml. of a mixture of equal volumes of dry benzene and dry toluene. The mixture was maintained under an atmosphere of nitrogen, and cooled in an ice bath, and to it were added 136 g. (0.49 mol) of N-benzoyl-5-keto-1,2,2a,3,4,5-hexahydrobenz[cd]indole. To the mixture while being cooled in the ice bath 106 g. (0.86 mol) of ethyl chloroacetate were added dropwise with stirring over a period of 10 minutes. The cold solution was stirred for 15 minutes, was warmed to room temperature and stirred for 15 minutes, and finally was heated and refluxed for 15 minutes. The mixture was cooled rapidly and treated with a few hundred grams of ice. The aqueous layer was separated, and the organic layer was washed successively with 1 l. of water, 1 l. of 1.5 N sulfuric acid, 1 l. of 0.7 N sulfuric acid, 1 l. of water and 1 l. of saturated sodium bicarbonate solution. The solution was dried over anhydrous magnesium sulfate, and the solvents were evaporated in vacuo. The syrupy glycidic ester remaining was dissolved in 1200 ml. of absolute ethanol, and to the solution were added slowly with shaking 65 ml. of 12.5 N sodium hydroxide solution. The mixture was allowed to stand for 20 minutes after which it was heated rapidly to 70–75° and held there for 5 minutes, and then cooled for about 1 hour. The sodium β-5-(N-benzoyl-1,2,2a,3,4,5-hexahydrobenz[cd]indolyl) glycidate which separated was filtered off, washed with methanol and ether, and dried. The yield was 124 g., 71 percent of theory. The salt melted with decomposition at about 220–223° C. A sample prepared for analysis by recrystallization from a mixture of methanol and ether gave the following analysis:

Analysis:
  Calculated for $C_{20}H_{16}NO_4Na$: N, 3.92; Na, 6.44
  Found: N, 3.85; Na, 6.65

EXAMPLE 7

*Semicarbazone of N-benzoyl-5-formyl-1,2,2a,3-tetrahydrobenz[cd]indole*

5 g. (0.014 mol) of sodium β-5-(N-benzoyl-1,2,2a,3,4,5-hexahydrobenz[cd]indolyl) glycidate was mixed with 100 ml. of dimethylformamide. To the mixture were added 4.5 g. (0.014 mol) of pyridine hydrobromide perbromide. The mixture was warmed to 60° and was then allowed to stand at room temperature for 3½ hours. To it was added a previously prepared solution of 4.2 g. of semicarbazide hydrochloride and 3.6 g. (0.042 mol) of anhydrous sodium acetate in 35 ml. of dimethyl formamide, and the mixture was heated on a steam bath for 1 hour. The dimethylformamide was evaporated in vacuo, the dark syrupy residue was treated with water, and the amorphous product which separated was filtered, and washed well with water. The precipitate was dissolved in a minimum of hot glacial acetic acid, the solution was treated with decolorizing carbon, and diluted with two volumes of methanol. After chilling to about 5° C. for a few hours a crystalline precipitate of the semicarbazone of N-benzoyl-5-formyl-1,2,2a,3 - tetrahydrobenz[cd]indole separated. The precipitate was filtered off and washed with small amounts of methanol and ether. The yield was 2.95 g., 61 percent of theory. It melted with decomposition at about 232–233° C.

Analysis:
  Calculated for $C_{20}H_{18}N_4O_2$: C, 69.35; H, 5.24; N, 16.18
  Found: C, 69.15; H, 5.24; N, 16.20

The use of acetic acid as a solvent in the above reaction in place of dimethyl formamide yields the same product in somewhat smaller yield.

EXAMPLE 8

*Enol acetate of N-benzoyl-5-formyl-1,2,2a,3,4,5-hexahydrobenz[cd]indole*

35.7 g. (0.1 mol) of sodium β-5-(N-benzoyl-1,2,2a,3,4,5-hexahydrobenz[cd]indolyl glycidate, were mixed with 15 g. of potassium acetate, 400 ml. of acetic anhydride, and 50 ml. of glacial acetic acid, and the mixture was refluxed for one hour. The solution was concentrated in vacuo to a syrup, traces of acetic anhydride were decomposed with a little methanol, and the solvent again removed in vacuo. The crystalline product consisting of the enol acetate of N-benzoyl-5-formyl-1,2,2a,3,4,5-hexahydrobenz[cd]indole was taken up in water containing a little methanol, filtered, dried and recrystallized from 200 ml. of a mixture of equal parts of benzene and petroleum ether. The yield was 15.5 g. It melted at about 158–162° C.

Analysis:
  Calculated for $C_{21}H_{19}NO_3$: C, 75.65; H, 5.74; N, 4.20
  Found: C, 75.50; H, 5.77; N, 4.45

EXAMPLE 9

Semicarbazone of N-benzoyl-5-formyl-1,2,2a,3-tetrahydrobenz[cd]indole 3.3 g. of the enol acetate were dissolved in 50 ml. of glacial acetic acid, and 3.2 g. of pyridine hydrobromide perbromide were added. The mixture was heated to 70° C., cooled to 30°, and mixed with 3.3 g. of semicarbazide hydrochloride and 3.0 g. of potassium acetate. The reaction mixture was shaken well, heated to 90°, treated with 5 ml. of water, and then kept at a temperature of 95° C. for ½ hour. The solvent was evaporated in vacuo, and water was added. The insoluble semicarbazone of N-benzoyl-5-formyl-1,2,2a,3-tetrahydrobenz[cd]indole was filtered off, washed with water, and recrystallized from a mixture of acetic acid and methanol. The yield was 1.0 g. The product melted with decomposition at about 233-234° C. The melting point showed no depression when mixed with sample of the semicarbazone prepared from the glycidic acid sodium salt.

EXAMPLE 10

N-benzoyl-5-formyl-1,2,2a,3-tetrahydrobenz[cd]indole 22.9 g. of the semicarbazone of N-benzoyl-5-formyl-1,2,2a,3-tetrahydrobenz[cd]indole were mixed with 160 g. of redistilled pyruvic acid, 230 ml. of chloroform and 10 ml. of water. The solution was shaken until homogeneous and allowed to stand for 3 hours. It was diluted with 200 ml. of chloroform and washed with three 300 ml. portions of water and with two 300 ml. portions of saturated sodium bicarbonate solution. The chloroform solution was dried over anhydrous magnesium sulfate, treated with decolorizing carbon, and concentrated to dryness in vacuo. The crystalline residue of N-benzoyl-5-formyl-1,2,2a,3-tetrahydrobenz[cd]indole was digested with 100 ml. of hot ethanol, cooled, filtered, and washed with methanol and ether. The yield was 16.1 g., 85 percent of theory. It melted at about 171-174° C. After recrystallization of a sample from ethanol, it melted at about 177-178° C.

Analysis:

Calculated for $C_{19}H_{15}NO_2$: C, 78.87; H, 5.23; N, 4.84

Found: C, 78.29; H, 5.73; N, 4.44

5-formyl-1,2,2a,3-tetrahydrobenz[cd]indole is obtained from the N-benzoyl derivative by refluxing a mixture of the latter compound and concentrated hydrochloric acid until complete solution results. Evaporation of the solution to dryness yields a mixture of the hydrochloride acid addition salt of 5-formyl-1,2,2a,3-tetrahydrobenz[cd]indole and benzoic acid. The mixture is treated with ether to dissolve the benzoic acid and leave the salt as a residue.

Treatment of a solution of the salt in water with an equivalent of sodium bicarbonate yields the free 5-formyl-1,2,2a,3-tetrahydrobenz[cd]indole. Acid addition salts of the base are prepared by reacting the base with an equivalent of acid by any of the customary procedures.

N-acyl derivatives of 5-formyl-1,2,2a,3-tetrahydrobenz[cd]indole are prepared by reacting the indole compound with the acyl halide or anhydride, examples of which are butyric anhydride, toluic acid chloride, cyclopentyl carboxylic acid chloride, and the like. Alternatively, in place of the N-benzoyl derivative of 5-keto-1,2,2a,3,4,5-hexahydrobenz[cd]indole, other N-acyl compounds, as for example the propionyl, caproyl, cyclohexanoyl etc. can be subjected to the procedures of Examples 6 to 9 inclusive to produce an N-acyl-5-formyl-1,2,2a,3-tetrahydrobenz[cd]indole.

EXAMPLE 11

α-Methyl-β-5-(N-benzoyl-1,2,2a,3,4,5-hexahydrobenz[cd]indolyl) glycidonitrile 6.7 g. of potassium were dissolved in 300 ml. of dry tertiary butyl alcohol, and the excess solvent was evaporated in vacuo. The potassium tertiary butylate was dissolved in 300 ml. of dry benzene, and to the solution were added 27.7 g. of N-benzoyl-5-keto-1,2,2a,3,4,5-hexahydrobenz[cd]indole. The mixture was cooled in ice under nitrogen, and to it were added dropwise with stirring over a period of about 5 minutes 15.4 g. of α-chloropropionitrile. The cooled mixture was stirred for 30 minutes, was refluxed for one hour, and was cooled and diluted with ice water. The benzene layer which separated was recovered and washed sequentially with water, dilute hydrocholoric acid, water, and saturated sodium bicarbonate solution, and was dried over anhydrous magnesium sulfate. The benzene was distilled in vacuo, and the syrupy residue of α-methyl-β-5-(N-benzoyl-1,2,2a,3,4,5-hexahydrobenz[cd]indolyl) glycidonitrile was crystallized from a mixture of nitromethane and methanol. The crystalline product was filtered off, washed with methanol and dried. The yield was 10.6 g., 32 percent of theory. It melted at about 147-150° C. A sample recrystallized from methanol-nitromethane mixture melted at about 156-158° C.

Analysis:

Calculated for $C_{21}H_{18}N_2O_2$: C, 76.34; H, 5.49; N, 8.48

Found: C, 76.19; H, 5.63; N, 8.41

EXAMPLE 12

N-benzoyl-5-acetyl-1,2,2a,3-tetrahydrobenz[cd]indole

A solution of 65.3 g. of α-methyl-β-5-(N-benzoyl-1,2,2a,3,4,5-hexahydrobenz[cd]indolyl)-glycidonitrile in 750 ml. of benzene and 750 ml. of absolute ether was cooled, and 210 g. of dry hydrogen chloride were passed into it with stirring and continued cooling. The solution was allowed to stand for 24 hours after which the solvents were removed completely in vacuo at 100° C., leaving a residue of N-benzoyl-5-acetyl-5-chloro-1,2,2a,3,4,5-hexahydrobenz[cd]indole-cyanohydrin. 750 ml. of collidine were added to the crude cyanohydrin, and the solution was refluxed for ½ hour. The collidine was removed in vacuo and 700 ml. of chloroform were added to the residue. The solution was washed successively with 1 l. of water with two 1 l. portions of N hydrochloric acid, with 1 l. of water and with a saturated sodium bicarbonate solution. The chloroform solution was dried over anhydrous magnesium sulfate, and the chloroform was evaporated in vacuo. The crystalline product consisting of N-benzoyl-5-acetyl-1,2,2a,3-tetrahydrobenz[cd]indole was taken up in petroleum ether and filtered. The yield was 43.5 g., 73 percent of theory. It melted at about 174-175° C. A sample melting at about 186-188° C. was obtained by recrystallizing the material from benzene.

Analysis:

Calculated for $C_{20}H_{17}NO_2$: C, 79.13; H, 5.65; N, 4.62

Found: C, 78.46; H, 5.85; N, 4.96

From the N-benzoyl compound the non-benzoylated compound and its acid addition salts are prepared by the procedures set forth in Example 10.

Other 5-acyl-1,2,2a,3 - tetrahydrobenz[cd]indoles are obtained by employing an α-chloroalkyl cyanide other than α-chloropropionitrile as described in Example 11. Thus for example, butyronitrile, capronitrile and the like can be employed to provide 5-acyl derivatives which contain a longer alkyl chain.

As was the case with 5-formyl-1,2,2a,3-tetrahydrobenz[cd]indole, other N-acyl derivatives can be employed instead of the N-benzoyl derivative, such being of the type described in connection with the 5-formyl compound in Example 10.

I claim:

1. A compound represented by the formula

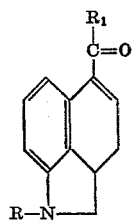

in which R represents a member of the group consisting of hydrogen, an acyl radical of a lower alkyl carboxylic acid and an acyl radical of a monocarbocyclic aromatic carboxylic acid, and $R_1$ represents a member of the group consisting of hydrogen and a lower alkyl radical.

2. A compound represented by the formula

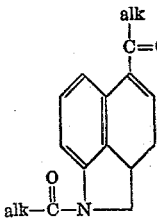

in which alk represents a lower alkyl group.

3. A compound represented by the formula

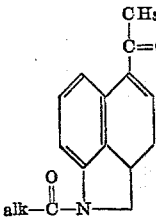

in which alk represents a lower alkyl group.

4. A compound represented by the formula

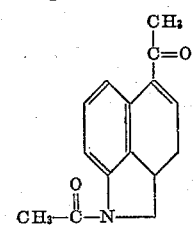

5. A compound represented by the formula

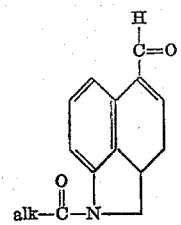

in which alk represents a lower alkyl group.

6. A compound represented by the formula

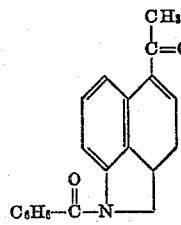

7. A compound represented by the formula

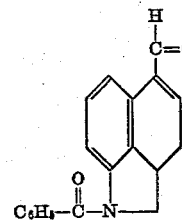

EDMUND C. KORNFELD.

References Cited in the file of this patent

UNITED STATES PATENTS

| Number | Name | Date |
|---|---|---|
| 2,621,186 | Grob | Dec. 9, 1952 |

OTHER REFERENCES

Uhle, Jr. Am. Chem. Soc., vol. 71, pp. 761-766 (1949).